US012204016B2

(12) United States Patent
Moses et al.

(10) Patent No.: US 12,204,016 B2
(45) Date of Patent: Jan. 21, 2025

(54) REVERSE-EPHEMERIS LUNAR NAVIGATION SYSTEM FOR LONG-DISTANCE ROUTE DETERMINATION

(71) Applicant: UNITED STATES OF AMERICA AS REPRESENTED BY THE ADMINISTRATOR OF NASA, Washington, DC (US)

(72) Inventors: Robert W. Moses, Poquoson, VA (US); Michael S. Mcbeth, Williamsburg, VA (US)

(73) Assignee: United States of America as represented by the Administrator of NASA, Washington, DC (US)

(*) Notice: Subject to any disclaimer, the term of this patent is extended or adjusted under 35 U.S.C. 154(b) by 497 days.

(21) Appl. No.: 17/727,717

(22) Filed: Apr. 23, 2022

(65) Prior Publication Data
US 2024/0402329 A1 Dec. 5, 2024

Related U.S. Application Data

(60) Provisional application No. 63/178,801, filed on Apr. 23, 2021.

(51) Int. Cl.
*G01S 13/76* (2006.01)
(52) U.S. Cl.
CPC .................. *G01S 13/767* (2013.01)
(58) Field of Classification Search
CPC ...................................... G01S 13/767
See application file for complete search history.

(56) References Cited

U.S. PATENT DOCUMENTS 10,254,392 B2 4/2019 Reed et al.
2018/0329013 A1* 11/2018 Robinson ................ G01S 19/10

OTHER PUBLICATIONS

Ely, Todd A., et al., "Constellations of Elliptically Inclined Lunar Orbits providing Polar and Global Coverage," AAS/AIAA Astrodynamics Specialists Conference, pp. 1-18, Aug. 7-11, 2005, Lake Tahoe, CA.
Folta, David, et al., "Lunar Frozen Orbits," AIAA/AAS Astrodynamics Specialists Conference and Exhibition, pp. 1-18, Aug. 21-24, 2006, Keystone, CO.
El-Salam, et al., "Families of frozen orbits of lunar artificial satellites," Applied Mathematical Modelling, Dec. 2016, pp. 9739-9753, vol. 40, Issues 23-24.
Sirwah, et al., "A study of the moderate altitude frozen orbits around the Moon," Results in Physics, pp. 1-10, Jun. 2020, vol. 17. 103148.

(Continued)

*Primary Examiner* — Vladimir Magloire
*Assistant Examiner* — Bongani Jabulani Mashele
(74) *Attorney, Agent, or Firm* — Matthew R. Osenga; Robin W. Edwards; Trenton J. Roche

(57) ABSTRACT

The disclosed system and method transmit a signal from the surface (or surroundings) of a celestial object to a satellite (for which you know the orbital elements) that re-transmits the signal back to a transceiver on the surface of the celestial object from which a time delay to obtain a range measurement and a Doppler shift to obtain the range-rate can be measured. With knowledge of the satellite's orbital elements and the range and range-rate, a location of the transceiver can be determined.

20 Claims, 4 Drawing Sheets

(56) References Cited

OTHER PUBLICATIONS

"Proximity-1 Space Link Protocol-Coding and Synchronization Sublayer," The Consultative Committee for Space Data Systems, pp. 1-47, Oct. 2019.
"Proximity-1 Space Link Production-Physical Layer," The Consultative Committee for Space Data Systems, pp. 1-36, Jan. 2018.
"Proximity 1-Space Link Protocol-Data Link Layer," The Consultative Committee for Space Data Systems, pp. 1-165, Jul. 2020.
"NanoCom Software Defined Radio," Space Micro Inc., pp. 1-2, Oct. 1, 2021, Rev. 6, San Diego, CA.

* cited by examiner

REVERSE-EPHEMERIS LUNAR NAVIGATION SYSTEM FOR LONG-DISTANCE ROUTE DETERMINATION

CROSS-REFERENCE TO RELATED PATENT APPLICATION(S)

This patent application claims the benefit of and priority to U.S. Provisional Patent Application No. 63/178,801, entitled Reverse-Ephemeris Lunar Navigation System for Long-Distance Route Determination filed on Apr. 23, 2021, the contents of which are hereby incorporated by reference in their entirety for any and all non-limited purposes.

STATEMENT REGARDING FEDERALLY SPONSORED RESEARCH OR DEVELOPMENT

The invention described herein was made by an employee/employees of the United States Government and may be manufactured and used by or for the Government of the United States of America for governmental purposes without the payment of any royalties thereon or therefore.

BACKGROUND

Existing earth-centric navigation systems such as global navigation satellite systems (GNSS), including the Global Positioning System (GPS), which rely on GPS-based position, navigation, and timing (PNT) data, are vulnerable to jamming, interference, or spoofing. There is a need for GPS-independent PNT solutions. Other systems, such as TRANSIT, use the Doppler shift in transmitted frequencies from a space object to a ground receiver to calculate the position of the receiver. Conversely, similar systems can use the shift in frequencies transmitted from a ground transmitter as seen at the space object. In either case, these systems require a long time before determining a fix (on the order of a couple minutes or more).

These earth-centric position-determination and navigation systems are not readily available to assets which may require position-determination on a different celestial body, such as the moon and other planets, and which require a position-determination in real-time or near real-time. Further, establishing an independent GNSS-like system for other celestial bodies would be prohibitively expensive and time-consuming. But space exploration, including lunar exploration, is proceeding. The Artemis program is NASA's successor program to the Apollo space program that successfully landed humans on the moon. Organized around a series of Orion and Space Launch System (SLS) missions, the short term program missions seek to return humans to the moon, with longer term program missions establishing sustainable systems and infrastructure on the moon including a base with habitats, rovers, resource extraction equipment (e.g., excavators), scientific instruments to support exploration. There will be numerous support missions required to meet the objectives. Critical to each and every successful mission is a high precision navigation system. Some example challenges to establishing a useful navigation system depend on intended usage, however, may include meeting requirements for sub-meter to millimeter accuracy, as well as the ability to provided navigation capabilities across all assets, e.g., astronauts, space craft and robotic vehicles while containing system cost and complexity.

Accordingly, based on at least one of these needs and others that exist, there is a need in the art for a system and process which can provide position information for an asset on (or near) the surface of a celestial body in real or near-real time.

BRIEF SUMMARY

In a first non-limiting embodiment described herein, a method for determining location of a transceiver located in close proximity to a surface of a celestial object, includes: receiving a beacon signal at the transceiver from at least one satellite orbiting the celestial object wherein the beacon signal is in a predetermined frequency band; transmitting a first signal to the at least one satellite on an uplink channel; transmitting by a transponder of the at least one satellite in response to receiving the first signal, a second signal on a downlink channel; receiving the second signal at the transceiver and determining a range measurement and a range rate measurement therefrom; and calculating a location of the transceiver using the range measurement, the range rate measurement, and a known orbital location of the at least one satellite. This and/or other methods described herein may be executed by one or more computer-readable mediums In a second non-limiting embodiment described herein, a system for determining location of a transceiver located in close proximity to a surface of a celestial body, includes: a transceiver operating to transmit and receive signals in a predetermined frequency band; at least one satellite in frozen elliptical orbit around the celestial body, wherein orbital location for the at least one satellite is known, the at least one satellite including a transponder operating to receive and transmit in the predetermined frequency band; wherein the transceiver further includes a processor programmed to determine a range measurement and a range rate measurement based, at least in part, on one or more signals received from the transponder of the one or more satellites; and calculate a location of the transceiver using the range measurement, the range rate measurement, and the orbital location of the at least one satellite.

In a third non-limiting embodiment described herein, a system for determining location of an asset located in close proximity to a surface of a celestial object, the system includes: means for transmitting a beacon signal from at least one satellite orbiting the celestial object; means for receiving the beacon signal at a location of the asset and transmitting a first signal to the at least one satellite on an uplink channel; means for receiving the first signal and transmitting a second signal on a downlink channel; means for receiving the second signal and determining a range measurement and a range rate measurement therefrom, and for calculating a location of the transceiver using the range measurement, the range rate measurement, and a known orbital location of the satellite These and other features, advantages, and objects of the present invention will be further understood and appreciated by those skilled in the art by reference to the following specification, claims, and appended drawings.

DETAILED DESCRIPTION

As an alternative to GNSS, U.S. Pat. No. 10,254,392, which is incorporated herein by reference in its entirety, discloses a system for determining position, attitude and time of an earth-based asset using a space object having a known ephemeris using a method called reverse-ephemeris. Space object ephemeris, e.g., space objects' position and velocity, and their orbital parameters over time, can be determined using, e.g., radar, telescopes, Lidar, Ladar, and Laser rangefinders. Aspects of the present lunar-based navigation system incorporates concepts of reverse-ephemeris to provide a highly accurate position-determination system for celestial body assets, such as lunar-based assets. Aspects of Reverse-Ephemeris Navigation disclosed herein uses range and range rate measurement to obtain position fixes and navigate using a known ephemeris of an orbiting object. In this regard, many illustrative examples throughout this disclosure are provided in the context of a lunar-based assets, however, those skilled in the art with the benefit of this disclosure will appreciate that other non-lunar assets may be tracked.

Figure 1:
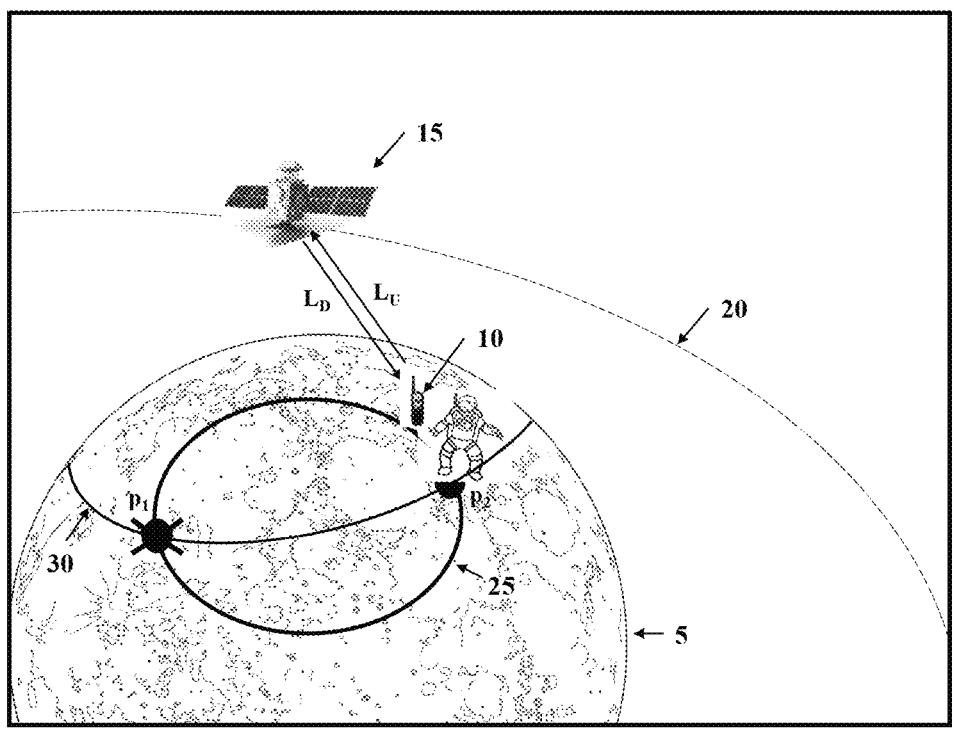
FIG. 1 is a diagram of a reverse-ephemeris navigation system in accordance with a preferred embodiment.

FIG. 1 provides a high-level diagram of a reverse-ephemeris navigation system in accordance with a preferred embodiment. Components of the example system include: a compact radio ranging transceiver 10 (hereinafter called a Reverse-Ephemeris Lunar Navigation or RELN transceiver or transceiver) located at the surface of the celestial object 5, e.g., moon, and one or more satellites (or spacecraft) 15 having a transponder. In a preferred embodiment, the RELN receiver operates in the microwave or millimeter bands where the uplink $L_U$ and downlink $L_D$ channels are separated. Though it will be appreciated that the uplink and downlink channels could overlap if necessary with the use of diplexers and other frequencies may be implemented in various embodiments. The one or more satellites may be in a highly elliptical frozen orbit 20 around the moon. One skilled in the art will recognize that the term frozen orbit is a term of art and refers, generally, to the orbit for an artificial satellite whose altitude remains relatively constant over a long period of time. The following documents, which are incorporated herein by reference in their entireties, provide additional descriptive information regarding frozen orbits of lunar satellites: Folta et. al., Lunar Frozen Orbits, AIAA/AAS Astrodynamics Specialists Conference and Exhibition, Keystone, CO, 21-24 Aug. 2006; El-Salam et al., Families of frozen orbits of lunar artificial satellites, Applied Mathematical Modelling, Volume 40, Issues 23-24, December 2016, Pages 9739-9753 and Sirwah et al., A study of the moderate altitude frozen orbits around the Moon, Results in Physics Volume 17, June 2020, 103148.

Figure 2:
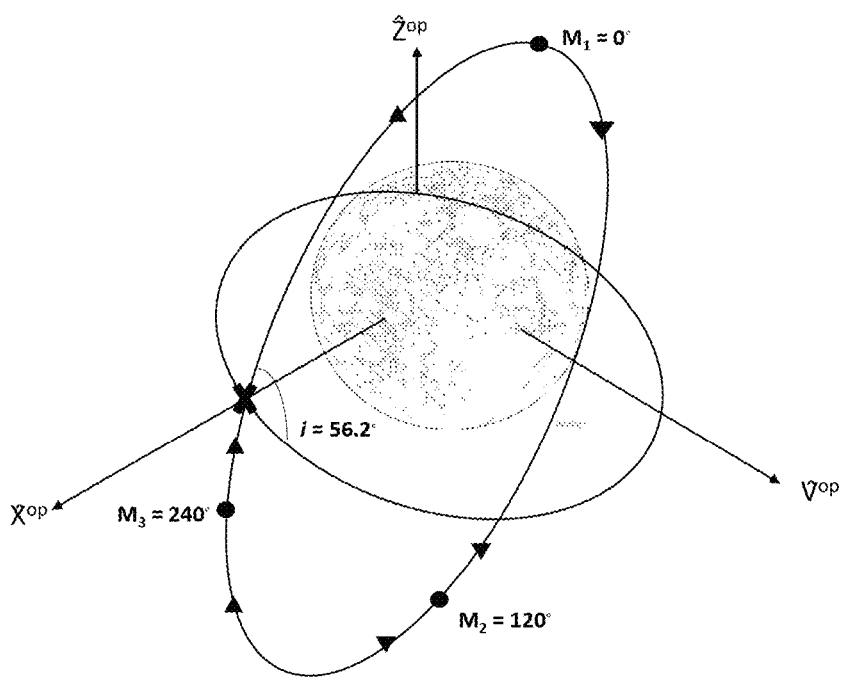
FIG. 2 is a diagram of a constellation of three satellites in accordance with a preferred embodiment.

In one example embodiment, the one or more satellites may consist of or comprise a constellation of three satellites (FIG. 2). The orbital elements of the three satellites in the identified constellation are as follows:

$\{a_1, e_1, i_1^{op}, \Omega_1^{op}, \omega_1^{op}, M_1\}$={6541.4 km, 0.6, 56.2°, 0°, 90°, 0°}.

$\{a_2, e_2, i_2^{op}, \Omega_2^{op}, \omega_2^{op}, M_2\}$={6543.9758657 km, 0.6, 56.2°, 0°, 90°, 120°}.

Figure 3:
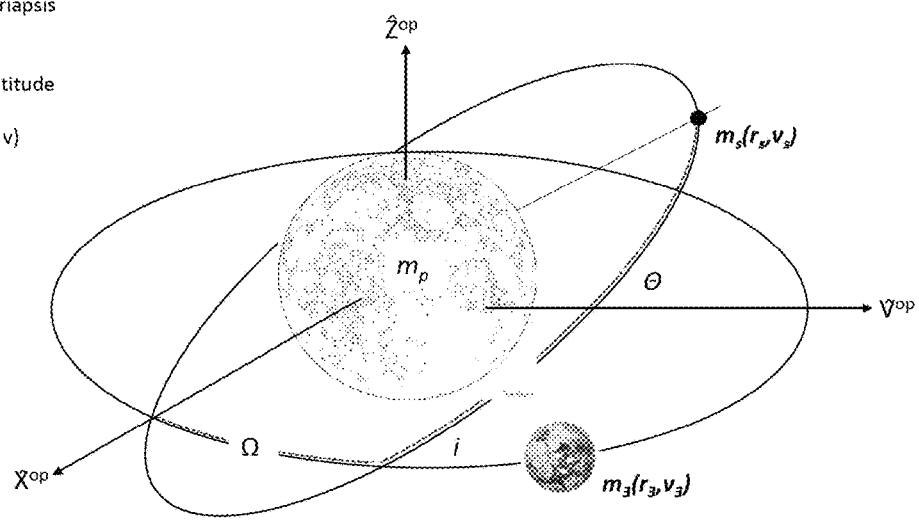
FIG. 3 is a diagram of orbital elements expressed in the Earth orbit plane frame of reference.

$\{a_3, e_3, i_3^{op}, \Omega_3^{op}, \omega_3^{op}, M_3\}$={6537.9213419 km, 0.6, 56.2°, 0°, 90°, 240°} wherein, a is the semi-major axis which is the sum of the periapsis and apoapsis distances divided by two, e is eccentricity which is the shape of the ellipse, describing how much it is elongated compared to a circle (not marked in diagram), i is inclination which is vertical tilt of the ellipse with respect to the reference plane, measured at the ascending node (where the orbit passes upward through the reference plane, the green angle i in the diagram), Ω is longitude of the ascending node which horizontally orients the ascending node of the ellipse with respect to the reference frame's vernal point, ω which is the argument of periapsis and defines the orientation of the ellipse in the orbital plane, as an angle measured from the ascending node to the periapsis (the closest point the satellite object comes to the primary object around which it orbits, and M which is the mean anomaly. FIG. 3 diagrams the orbital plane with reference to the Earth's equatorial plane as a plane of reference, wherein $m_p$ is the mass of the primary body which is the Moon, $m_s(r_s, v_s)$ is the mass of the satellite in lunar orbit with inertial position, $r_s$, and velocity, $v_s$, and $m_3(r_3, v_3)$ is the mass of the third body which in this case is the Earth with inertial position, $r_3$, and velocity, $v_3$.

Each satellite is equipped with a translating transponder that receives signals on uplink channels (S-Band) and may immediately transmits them on down link channels (also S-Band). This simplifies the orbital payload and makes it available as a communications satellite at the same time. In certain embodiments, the system is intended to provide location support for assets at the southern pole of the moon in accordance with the goals of the Artemis program. Accordingly, the three satellite constellation is selected so as to provide 2-fold coverage of this portion of the moon's surface (see, Ely et al., Constellations of Elliptically Inclined Lunar Orbits providing Polar and Global Coverage, AAS/AIAA Astrodynamics Specialists Conference, Lake Tahoe, CA, 07-11 Aug. 2005, which is incorporated herein by reference in its entirety). Prior research can be used to identify candidate satellites (spacecraft) and/or constellations of satellites in accordance with areas of the celestial body for which location coverage is required. As mentioned above, appropriate satellites and/or constellations of satellites must have highly elliptical frozen orbits which account for, inter alia, gravitational accelerations and solar radiation pressure. Further, the orbital configuration must provide continuous coverage of the identified area of the celestial body without the need for any deterministic control. Though it is anticipated that some active orbit control using stationkeeping propellant may be required to maintain the frozen orbit.

Figure 4:
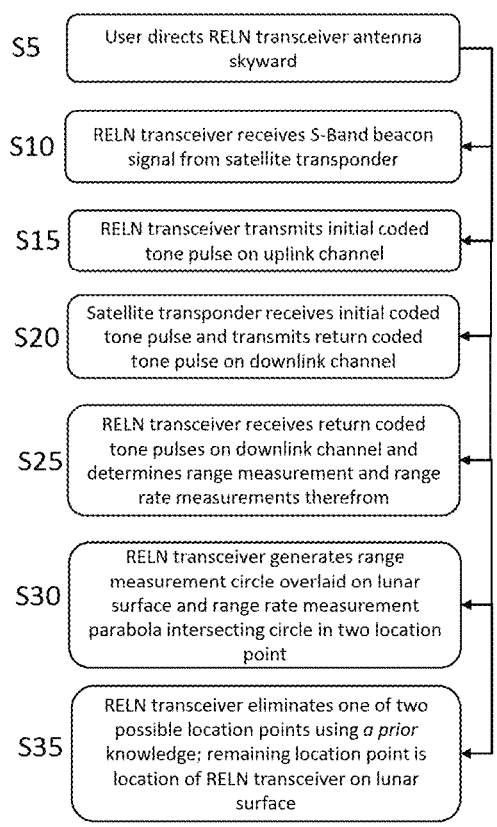
FIG. 4 is a process for determining location of an asset on the lunar surface using reverse-ephemeris navigation system in accordance with a preferred embodiment.

Referring to FIG. 4, which shows a flowchart that may be wholly or partially utilized to determine a location of a transceiver, which in certain embodiments may be a portable or hand-held RELN transceiver (and thus co-located asset, e.g., astronaut, vehicle, etc.) on the surface of an object such as a moon. In one embodiment, a helical (or other appropriate antenna) antenna of the RELN transceiver may be oriented toward the sky S5, or otherwise configured to obtain the S-Band beacon signal from a satellite transponder (e.g. S10). Once the beacon signal has been acquired, the RELN transceiver may transmit a series of coded tone pulses to the satellite on an uplink channel S15, which is received by the satellite transponder. Upon receipt of the uplink pulse, the satellite transponder may return a coded tone pulse on the corresponding downlink channel S20, which is received by the RELN transceiver. RELN determines range measurement and range rate measurements therefrom S25. The time delay between transmission and reception of the coded tone pulse at the RELN transceiver may be utilized to provide a range measurement. The Doppler shift in frequency in the downlink channel may also provide a range rate measurement. The satellite's ephemeris provides a precise location of its orbital location during the range and range rate measurement. In accordance with the schematic of FIG. 1, each range measurement defines a circle 25 on the surface and each range rate measurement defines a parabola 30 that intersects the circle at two points $p_1$ and $p_2$. The RELN transceiver generates range measurement circle overlaid on the lunar surface and range rate measurement parabola intersecting the circle in two location point S30 and uses a priori knowledge and/or multiple measurements to eliminate one of the points thus providing location of the asset ($p_2$) in this specific example S35.

In an exemplary, specific point design of the one example embodiment, the RELN transceiver may be located on the lunar surface and an S-Band (e.g., 13 cm; 2,400-2,450 MHz) 10 W transceiver ranging with translating transponders on three satellites in frozen elliptical orbits to provide continuous 2-fold coverage. In one embodiment, the RELN transceiver is hand-held and includes a pointable helical antenna. By way of example only, the S-Band helix antenna may have a cylindrical shape that is 12.37 cm (4.8 inches) in diameter and 14.2 cm (5.6 inches) long. This antenna has a gain of 10 dB and a half-power-beamwidth of about 60 degrees. One skilled in the art appreciates that one or more RELN transceivers could be anchored to a vehicle, such as rover, which may be autonomous. The RELN transceivers include processor and storage capabilities in order to execute the processing steps described herein. In this regard, aspects of the present disclosure also relate to one or more non-transitory computer-readable mediums that comprise computer-executable instructions that when executed by a processor, are configured to perform at least one or more processes or portions thereof that are described within this disclosure.

The exemplary point design provides service to 300 simultaneous users at 3 kHz bandwidth channels plus an unused guard channel over 1.8 MHz of bandwidth at the satellite transponder. If the uplink is at one end of the S-Band and the downlink is at the other, there is ~48 MHz of bandwidth which is sufficient separation when using helical antennas at the RELN transceiver. Alternatively, an efficient diplexer could be used to maintain separate uplink and downlink channels.

Each satellite transponder is assumed to have a noise temperature of 500K, bandwidth of 1.8 MHz, and a gain of 110 dB. The satellite transmits and receive antennas are assumed to have a gain of 26 dB.

As one skilled in the art will appreciate, analyzing the anticipated link budget is a critical step in system design. Given the exemplary point design parameters described above, and estimating the longest free space path from the lunar surface user to a satellite in the proposed constellation at apolune (point of farthest from the center of attraction for a lunar orbit), nominal distance, $D_N$, is calculated as follows for an elliptical orbit: $D_N = a + c - r_M = 8,732.4$ km, wherein e is the eccentricity and is 0.6; a is the length of the semi-major axis and is 6,544 km; c is linear eccentricity which is the distance between the center and a focus and is equal to (e) x (a)=3,926.4; $r_M$ is the radius of the Moon and is 1,738 km.

The link budget analysis starts with the following equation for uplink power budget:

$$P_{ru} = P_{tu} + G_{tu} + G_{ru} - L_{pu} \quad (1)$$

wherein, $P_{ru}$ is received uplink power (dBm), $P_{tu}$ is transmitted power (dBm), $G_{tu}$ is transmitter gain (dB), $G_{ru}$ is receiver gain (dB) and $L_{pu}$ power loss (dB). The path loss $L_{pu}$ is calculated as:

$$L_{pu} = -27.55 \text{ dB} + 20 \log_{10}(f \text{ (MHz)}) + 20 \log_{10}(\text{distance (m)}) \quad (2)$$

$$L_{pu} = -27.55 \text{ dB} + 20 \log_{10}(2,425) + 20 \log_{10}(8,732.4 \times 10^3) \quad (3)$$

$$L_{pu} = 179 \text{ dB} \quad (4)$$

$$P_{ru} = P_{tu} + G_{tu} + G_{ru} - L_{pu} = 40 + 10 + 26 - 179 = -103 \text{ dBm} \quad (5)$$

Next, calculate the noise power at the satellite $$N_u = kT_s B_N = \quad (6)$$
$$(1.38 \times 10^{-23})(500)(1.8 \times 10^6) = 1.242 \times 10^{-14} = -109.1 \text{ dBm}$$

wherein k is the Boltzmann constant equal to $1.38 \times 10^{-23}$ J/K, $T_s$ is the spacecraft temperature in Kelvin taken as a worse case sun exposed 500 K, $B_{NS}$ is the satellite receiver bandwidth set to 1.8 MHz. We calculate $C_u/N_u$ ratio:

$$C_u/N_u = P_{ru} - N_u = -103 + 109.1 = 6.1 \text{ dB} \quad (7)$$

wherein $C_u$ is carrier. We calculate the power at the satellite transponder output:

$$P_t = P_{ru} + G = -103 \text{ dBm} + 110 \text{ dB} = 7 \text{ dBm} \quad (8)$$

And calculate the power received on the downlink:

$$P_{rd} = P_t + G_{txs} + G_{rcvt} - L_p = 7 + 26 + 10 - 179 = -136 \text{ dBm} \quad (9)$$

wherein $G_{txs}$ is the satellite transmitter gain and $G_{rcvt}$ is the RELN transceiver antenna gain. The noise power at the receiver, $N_D$, is $$N_D = kT_r B_{NR} = \quad (10)$$
$$(1.38 \times 10^{-23})(300)(1.0 \times 10^3) = 1.242 \times 10^{-17} = -139.1 \text{ dBm}$$

wherein k is the Boltzmann constant, $T_R$ is the receiver temperature in Kelvin taken as 300 K, $B_{NR}$ is the satellite receiver bandwidth set to 3.0 kHz.

Finally, we can calculate the carrier to noise ratio at the downlink receiver as follows:

$$C_D/N_D = P_{rd} - N_D = -136 + 139.1 = 3.1 \text{ dB} \quad (11)$$

This margin confirms that the link is able to close near the longest ranges that are anticipated for operation while maintaining a relatively low power of 10 Watts, small sized lunar surface transceiver with a compact helical antenna (5-inch diameter and 6-inch length). One skilled in the art will appreciate the tradeoffs which may be explored to improve upon this margin in dependence on numerous factors including SWAP factors, mission-specific factors, etc.

As an alternative to the analog transponders and transceivers described above discussed above with respect to the first embodiment, a digital embodiment is also contemplated. In fact, any means to transmit a signal from the lunar surface (or surroundings) to a spacecraft (for which you know the orbital elements) that re-transmits the signal back to the Lunar surface from which a time delay to obtain a range measurement and a Doppler shift to obtain the range-rate can be measured, may be considered within the scope of the embodiments herein. One such exemplary digital embodiment is to use transceivers, both lunar-based and satellite based, which are programmed to use a communication standard such as the Proximity-1 space link protocol which was originally developed by Consultative Committee for Space Data Systems (CCSDS) in order to provide short-range communications among landers, probes and orbiting relays. Protocol details can be found in the CCSDS's latest blue books recommending standards for: PROXIMITY-1 SPACE LINK PROTOCOL—CODING AND SYNCHRONIZATION SUBLAYER (October 2019); PROXIMITY-1 SPACE LINK PROTOCOL—PHYSICAL LAYER (January 2018): and PROXIMITY-1 SPACE LINK PROTOCOL—DATA LINK LAYER (July 2020). The teachings and descriptions therein are incorporated herein by reference. One such transceiver which uses the Proximity-1 protocol and may be used in the system described herein is the NanoCom SDR (software defined radio) developed by Space Micro, described in the product sheet NanoCom Software Defined Radio, Rev. 6 (Oct. 1, 2021) which is incorporated herein by reference in its entirety.

As discussed herein, knowledge of the orbital elements of the satellites (or spacecraft) is required to implement the reverse-ephemeris navigation process of the present embodiments. While this information could be known a priori and programmed into a database associated with the RELN receiver, a spacecraft's ephemeris data could also be collected in real-time or quasi real-time, as-needed from mission control, which is tasked with the function of tracking the orbit of spacecraft under their control. Additionally, the process described herein could be used in a forward-ephemeris process to determine a spacecraft's orbital elements or to provide more accurate estimates of these orbital elements. In the forward-ephemeris process, it is the lunar-surface radio location that is known in advance, and thus can collect and process signal information from spacecraft to determine the spacecraft's orbital position and thereby its orbital elements. This updated or refined orbital element data could then be sent to or loaded into other RELN transceivers operating in the reverse-ephemeris mode on the lunar surface to improve the navigation accuracy. Additionally, this information could be transmitted to mission control so that they benefit from the updated orbital elements.

It is to be understood that the novel concepts described and illustrated herein may assume various alternative orientations and step sequences, except where expressly specified to the contrary. It is also to be understood that the specific systems, devices and processes illustrated in the attached drawings, and described herein, are simply exemplary embodiments of the embodied concepts defined in the appended claims. Accordingly, specific dimensions and other physical characteristics relating to the embodiments disclosed herein are not to be considered as limiting, unless the claims expressly state otherwise.

Reference in the specification to "one embodiment" or to "an embodiment" means that a particular element, feature, structure, or characteristic described in connection with the embodiments is included in at least one embodiment. The appearances of the phrases "in one embodiment," "in some embodiments," and "in other embodiments" in various places in the specification are not necessarily all referring to the same embodiment or the same set of embodiments.

As used herein, the terms "comprises," "comprising," "includes," "including," "has," "having" or any other variation thereof, are intended to cover a non-exclusive inclusion. For example, a process, method, article, system or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

What is claimed is:

1. A system configured to determine a location of a transceiver, the system comprising:
   a non-transitory computer-readable medium comprising computer-executable instructions that when executed by a processor, cause the processor to perform at least, including at least:
   receive a beacon signal at a transceiver in operative communication with the processor, the beacon signal being received from at least one satellite orbiting a celestial object, wherein the beacon signal is in a predetermined frequency band;
   transmit an uplink signal to the at least one satellite on an uplink channel;
   transmit by a transponder of the at least one satellite in response to receiving the first signal, a downlink signal on a downlink channel;
   receive the downlink signal at the transceiver and determining a range measurement and a range rate measurement therefrom; and
   calculate a location of the transceiver using the range measurement, the range rate measurement, and a known orbital location of the at least one satellite.

2. The system according to claim 1, wherein as part of calculating the location of the transceiver, the computer-readable medium further comprises instructions that when executed by the processor, cause the processor to at least:
   generate a first conic section of possible transceiver locations and a second conic section of possible transceiver locations, wherein the first and second conic sections intersect at two points; and
   eliminate one of the two points as the location of the transceiver on the celestial object using prior data.

3. The system according to claim 1, wherein the predetermined frequency band is the S-band.

4. The system according to claim 1, the system further comprises the transceiver, and wherein the transceiver is handheld.

5. The system according to claim 4, wherein the transceiver includes a helical antenna.

6. The system according to claim 1, wherein the transceiver is configured to operate in a first operating mode in which it communicates with at least one satellite in a frozen elliptical orbit around the space object.

7. The system according to claim 4, wherein the transceiver operating power is equal to or below 10 Watts.

8. The system according to claim 1, wherein as part of determining the range rate measurement, the computer-readable medium includes computer-executable instructions that when executed by the processor, cause the processor to at least:
calculate a Doppler shift between the uplink and downlink signals.

9. The system according to claim 1, wherein as part of determining a range measurement, the computer-readable medium includes computer-executable instructions that when executed by the processor, cause the processor to at least:
calculate a time delay between transmission of the uplink signal by the transceiver and receipt of the downlink signal by the transceiver.

10. A system configured to determine a location of a transceiver, the system comprising:
a transceiver configured to transmit and receive signals in a predetermined frequency band;
a processor;
a non-transitory computer-readable medium comprising computer-executable instructions that when executed by the processor cause the processor to at least:
obtain a known orbital location for at least one satellite operating in a frozen elliptical orbit around a celestial body;
receive one or more signals from a transponder of the one or more satellites;
determine a range measurement and a range rate measurement based, at least in part, on the one or more signals received from the transponder of the one or more satellites; and
calculate a location of the transceiver using at least the range measurement, the range rate measurement, and the orbital location of the at least one satellite.

11. The system according to claim 10, wherein to calculate the location of the transceiver, the computer-readable medium further includes computer-readable instructions that when executed by the processor cause the processor to at least:
generate a first conic section of possible transceiver locations and a second conic section of possible transceiver locations, wherein the first and second conic sections intersect at two points; and
eliminate one of the two points as the location of the transceiver on the celestial object using prior data.

12. The system according to claim 10, wherein the predetermined frequency band is the S-band.

13. The system according to claim 10, wherein the transceiver is handheld.

14. The system according to claim 13, wherein the transceiver includes a helical antenna.

15. The system according to claim 13, wherein the transceiver operating power is equal to or below 10 Watts.

16. The system according to claim 10, wherein the computer-readable medium includes computer-executable instructions that when executed by the processor causes the processor to determine the range rate measurement by calculating a Doppler shift between signals passed between the transceiver and the transponder.

17. The system according to claim 10, wherein the computer-readable medium includes computer-executable instructions then when executed by the processor cause the processor to determine a range measurement by calculating a time delay between transmission of an uplink signal by the transceiver and receipt of a downlink signal from the transponder by the transceiver.

18. The system according to claim 10, wherein the at least one satellite is a constellation of three satellites, in which the transceiver is configurable to be in within communication proximity of at least one of the satellites at all times while in a first operating mode.

19. A system for determining location of an asset, the system comprising:
means for transmitting a beacon signal from at least one satellite orbiting a celestial object;
means for receiving the beacon signal at a location of the asset and transmitting a first signal to the at least one satellite on an uplink channel;
means for receiving the first signal and transmitting a second signal on a downlink channel;
means for receiving the second signal and determining a range measurement and a range rate measurement therefrom, and for calculating a location of the transceiver using the range measurement, the range rate measurement, and a known orbital location of the satellite.

20. The system according to claim 19, wherein the system uses means selected from the group consisting of analog means and digital means.

* * * * *